United States Patent [19]

Sherburne et al.

[11] Patent Number: 5,621,388
[45] Date of Patent: Apr. 15, 1997

[54] SYSTEM FOR MONITORING AND LOCATING A PERSON WITHIN A PRESELECTED DISTANCE FROM A BASE-STATION

[76] Inventors: Glenn M. Sherburne, 441 Crescent Dr., Albert Lea, Minn. 56007; Robert A. Brasse, R.D. 3 Town Line Rd., Malone, N.Y. 12953

[21] Appl. No.: 349,702

[22] Filed: Dec. 5, 1994

Related U.S. Application Data

[63] Continuation of Ser. No. 75,071, Jun. 10, 1993, abandoned.

[51] Int. Cl.$^6$ ................................................ G08B 23/00
[52] U.S. Cl. .................... 340/573; 340/539; 340/521; 340/571; 340/568
[58] Field of Search ..................... 340/572, 573, 340/539, 571, 521, 568, 502, 691; 367/6; 342/357, 450, 457

[56] References Cited

U.S. PATENT DOCUMENTS

| | | | |
|---|---|---|---|
| 1,885,023 | 10/1932 | Dieckmann | 340/990 |
| 3,357,020 | 12/1967 | Slifer, Jr. | 342/44 |
| 3,419,865 | 12/1968 | Chisholm | 343/112 |
| 3,458,889 | 8/1969 | Tann | 15/250.12 |
| 3,568,161 | 3/1971 | Knickel | 340/172.5 |
| 3,646,580 | 2/1972 | Fuller et al. | 325/53 |
| 3,680,121 | 7/1972 | Anderson et al. | 343/112 |
| 3,757,290 | 9/1973 | Ross et al. | 340/23 |
| 3,906,436 | 9/1975 | Kurauchi et al. | 340/23 |
| 4,494,119 | 1/1985 | Wimbush | 343/457 |
| 4,593,273 | 6/1986 | Narcisse | 340/539 |
| 4,596,988 | 6/1986 | Wanka | 343/457 |
| 4,651,156 | 3/1987 | Martinez | 342/457 |
| 4,701,760 | 10/1987 | Raoux | 340/993 |
| 4,740,792 | 4/1988 | Sagey et al. | 342/457 |
| 4,742,357 | 5/1988 | Rackley | 342/457 |
| 4,777,478 | 10/1988 | Hirsch et al. | 340/573 |
| 4,792,796 | 12/1988 | Bradshaw et al. | 340/539 |
| 4,799,062 | 1/1989 | Sanderford, Jr. et al. | 342/450 |
| 4,812,852 | 3/1989 | Bent et al. | 342/457 |
| 4,813,025 | 3/1989 | Rowland et al. | 367/6 |
| 4,906,972 | 3/1990 | Spencer | 340/573 |
| 4,908,629 | 3/1990 | Apsell et al. | 342/457 |
| 4,916,455 | 4/1990 | Bent et al. | 342/457 |
| 4,954,836 | 9/1990 | Sakuma | 342/450 |
| 5,003,317 | 3/1991 | Gray et al. | 342/457 |
| 5,021,794 | 6/1991 | Lawrence | 342/457 |
| 5,045,861 | 9/1991 | Duffett-Smith | 342/457 |
| 5,068,656 | 11/1991 | Sutherland | 340/993 |
| 5,086,290 | 2/1992 | Murray et al. | 340/539 |
| 5,115,223 | 5/1992 | Moody | 340/573 |
| 5,142,281 | 8/1992 | Park | 340/991 |
| 5,159,344 | 10/1992 | Robinson et al. | 342/44 |
| 5,173,710 | 12/1992 | Kelley et al. | 342/463 |
| 5,218,344 | 6/1993 | Ricketts | 340/573 |
| 5,289,163 | 2/1994 | Perez et al. | 340/539 |
| 5,461,365 | 10/1995 | Schlager et al. | 340/573 |

*Primary Examiner*—John K. Peng
*Assistant Examiner*—Benjamin C. Lee
*Attorney, Agent, or Firm*—Fay, Sharpe, Beall, Fagan, Minnich & McKee

[57] ABSTRACT

In a system for monitoring, within a preselected distance or location defining the perimeter of a preselected distance, and locating the position of persons, animals or moving objects, a base-station generates an interrogation signal which, when detected by one or more transceiver units triggers the one or more of the transceiver units to generate a return signal. Each of the transceiver units, upon being located outside the preselected distance or upon becoming inoperable, detects an interruption in the interrogation signal, ceases to generate the return signal, alerts the user of the transceiver unit and, after a delay period, triggers a homing signal. The base-station, upon detecting an interruption in the return signal from any one of the transceiver units, triggers a delay period for that transceiver unit and, upon expiration of the delay period, triggers locating circuitry to determine the position of the transceiver unit. Moreover, the base-station operates independently for each of the one or more transceiver units.

20 Claims, 5 Drawing Sheets

५,६२१,३८८

SYSTEM FOR MONITORING AND LOCATING A PERSON WITHIN A PRESELECTED DISTANCE FROM A BASE-STATION

This application is a continuation of application Ser. No. 08/075,071, filed on Jun. 10, 1993, now abandoned.

FIELD OF INVENTION

The present invention provides a system for monitoring a person, or persons, to determine if they remain within a preselected distance from a base-station and for locating their position should they move or be moved outside the preselected distance from the base-station.

BACKGROUND OF THE INVENTION

Conventional means for locating persons, animals or moving objects often utilize a radio transmitter adapted to be worn by the person or mounted in the movable object, such as a vehicle, which is activated by receipt of an emergency signal containing a unique address code for the radio transmitter. Once activated by a signal or automatically after the passage of a period of time, the radio transmitter sends out a homing signal. The homing signal is then tracked by radio direction finding and distance measuring equipment which indicates the transmitter's direction and distance.

Some locating devices contain "patch-through" systems, whereby a mobile transceiver communicates with complex location finding beacons. The beacons process the transmitted signals to determine and, subsequently, to transmit the precise location of the object to the remote base-station.

Still other devices utilize a transmitting device, attached to a person confined to a specific location, e.g., a person on probation or house arrest. The transmitting device generates signals to a base-station, such as a police station, when the person moves outside the specified location. However, the communication in these devices is usually one-way, i.e., from the transmitting device to the base-station. If the transmitting device does not receive a signal from the base-station, it will not alert the person on whom it is placed when that person moves outside the specified location.

Another locating device operates by continuously determining the position of an object relative to a predetermined acceptable route between two points and generating an exception report upon the object's movement outside of that route. The exception report is then transmitted to a remote central dispatcher. One disadvantage of this approach is that there is no indication to the user of the object of its position outside the acceptable route so that the user may return the object to the acceptable route.

Thus, conventional devices for monitoring and locating people or objects present several disadvantages. They do not provide for: continuous monitoring of the location of one or more children within a specified area, automatic warning to both an observer, such as a parent, and to each of one or more persons being observed, such as children, that one or more of the children has moved beyond the preselected distance from a base-station, automatic generation of homing signal or signals if the child or children do not return within the preselected distance within a preselected delay period, automatic indication to the parent that the child or children have remained beyond the preselected distance for longer than the preselected delay period, continuous locating of the child or children based on the detection of homing signals, and automatic resumption of continuous monitoring of the child or children which return within the preselected distance from the base-station.

SUMMARY OF THE INVENTION

The present invention provides a system for monitoring, children, for example, other persons or objects, to determine if they remain within a preselected distance from a base-station, and for locating their position should they move or be moved outside the preselected distance from the base-station.

Another advantage of the present invention is to continuously determine whether the children are within or outside of the preselected distance; to indicate to both the person using the invention and the children that the children are outside the preselected distance during a warning period and for a period greater than the warning period; and to allow the person using the invention to determine the precise location of the children after the children move outside of the preselected distance.

Still another advantage of the present invention is the automatic resumption of either the monitoring or locating functions for each of the one or more children after the child moves within or outside of the preselected distance, respectively. In this way, the present invention automatically reestablishes the monitoring function after operating in the locating function for each of the children when they relocate themselves within the preselected distance.

The present invention provides a monitoring and locating system which comprises: a base-station and a remote transceiver; the base-station provided with means for generating an interrogation signal for receipt by the remote transceiver at a preselected interrogation distance from a fixed point; the base-station provided with means for detecting the receipt of a homing signal generated by the remote transceiver; the base-station provided with means for detecting the receipt or interruption of a return signal generated by the remote transceiver and for alerting a user of the base-station of the interruption of the return signal; the base-station provided with means for locating the homing signal generated by the remote transceiver; the remote transceiver provided with means for detecting the interrogation signal within the preselected interrogation distance from the fixed point; the remote transceiver provided with means for generating the return signal in response to the interrogation signal; the remote transceiver provided with means for detecting the receipt or interruption of the interrogation signal and for alerting a user of the remote transceiver that the remote transceiver has moved beyond the preselected interrogation distance; and, the remote transceiver provided with means for generating a homing signal after the remote transceiver moves beyond the preselected interrogation distance from the fixed point.

The present invention also provides a monitoring and locating system which comprises: a base-station and a plurality of remote transceivers, the base-station provided with means for generating a plurality of distinct interrogation signals for receipt by the plurality of remote transceivers at a preselected interrogation distance from the base-station each of the plurality of distinct interrogation signals adapted to communicate with one of the plurality of remote transceivers; the base-station provided with means for detecting and distinguishing between the receipt of a plurality of homing signals; the base-station provided with means for detecting the receipt or interruption of each of the plurality of distinct return signals generated by the plurality of remote transceivers and for alerting a user of the base-station of the interruption of each of the plurality of distinct return signals; the base-station provided with means for locating the plurality of homing signals generated by the plurality of the remote transceivers; the plurality of remote transceivers adapted to detect one of the plurality of distinct interrogation signals within the preselected distance from the base-station; each one of the plurality of remote transceivers provided with means for generating a distinct return signal in response to one of the distinct interrogation signals; each one of the plurality of remote transceivers provided with means for detecting the receipt or interruption of the interrogation signals and for alerting a user of one of the plurality of remote transceivers that the user's remote transceiver has moved beyond the preselected interrogation distance; and, each one of the plurality of remote transceivers provided with means for generating a homing signal in response to moving beyond the preselected distance from the base-station.

DETAILED DESCRIPTION OF THE INVENTION

Figure 1:
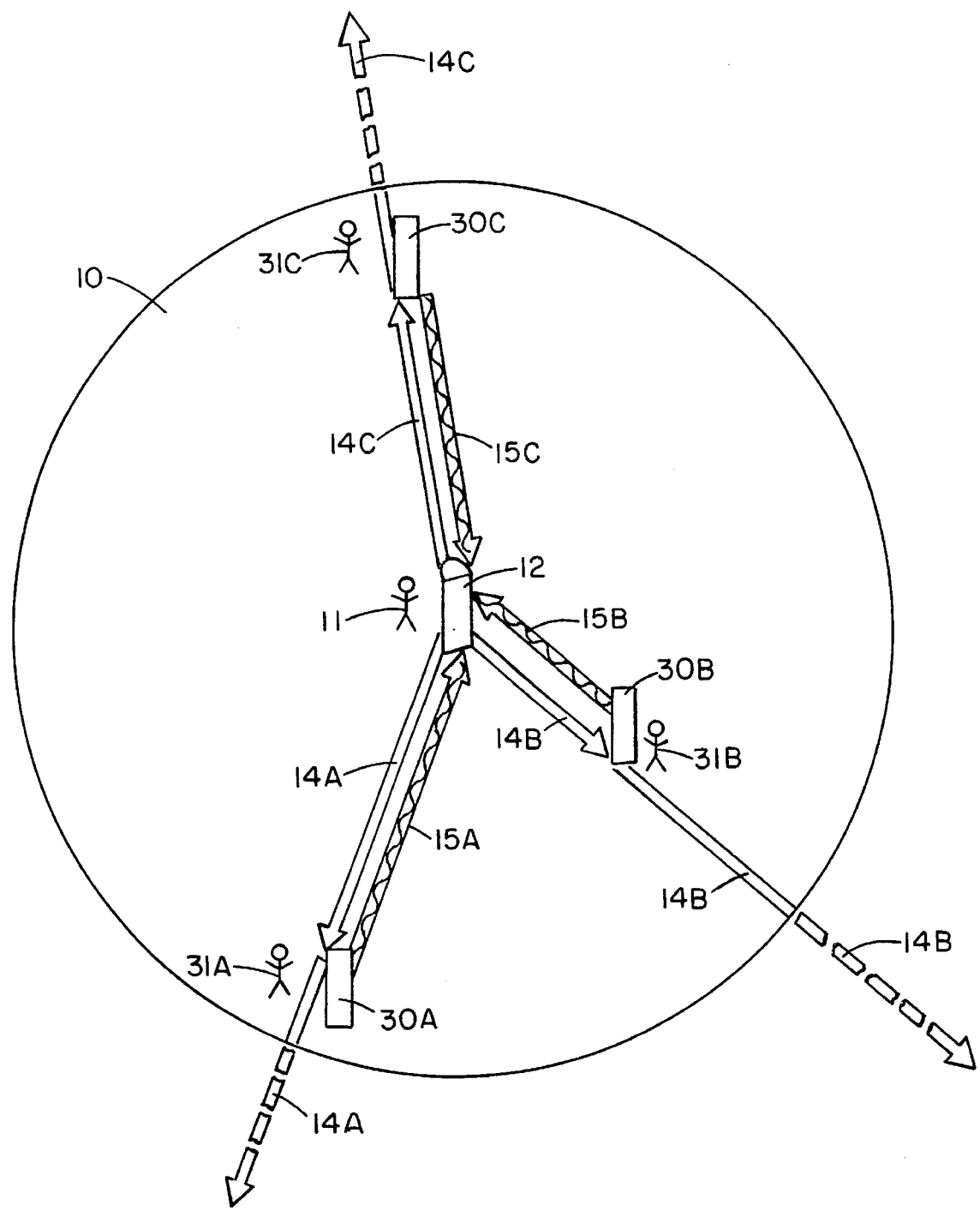
FIG. 1 is a functional block diagram showing the basic operation of a representative embodiment according to the present invention when a base-station unit is operating in a monitoring function.

FIG. 1 is a functional block diagram showing the basic operation of a representative embodiment according to the present invention when a base-station unit 12 is operating in a monitoring function. The monitoring and locating system of the representative embodiment according to the present invention, indicated generally at 1, shows a preselected distance 10, the base-station unit 12, one or more transceiver units, for example, transceiver units 30A, 30B, 30C, a base-station unit user 11, transceiver unit users 31A, 31B, 31C, e.g., children, interrogation signals 14A, 14B, 14C, and return signals 15A, 15B, 15C.

Figure 2:
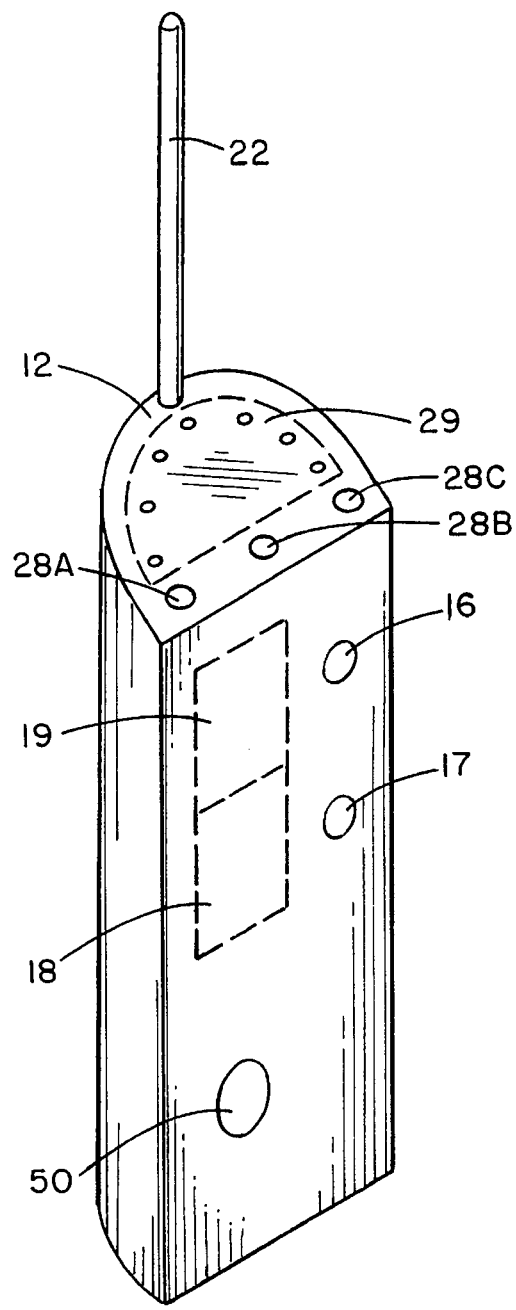
FIG. 2 is an illustration of the base-station unit of the representative embodiment according to the present invention.

FIG. 2 is an enlarged view of the base-station unit 12 shown in FIG. 1. FIG. 2 shows a custom set button 16, an option button 17, a base-station-receiving component 18, a base-station-transmitting component 19, a base-station antenna 22, an auditory means 50, transceiver indicators 28A, 28B, 28C and a location indicator 29.

Figure 3:
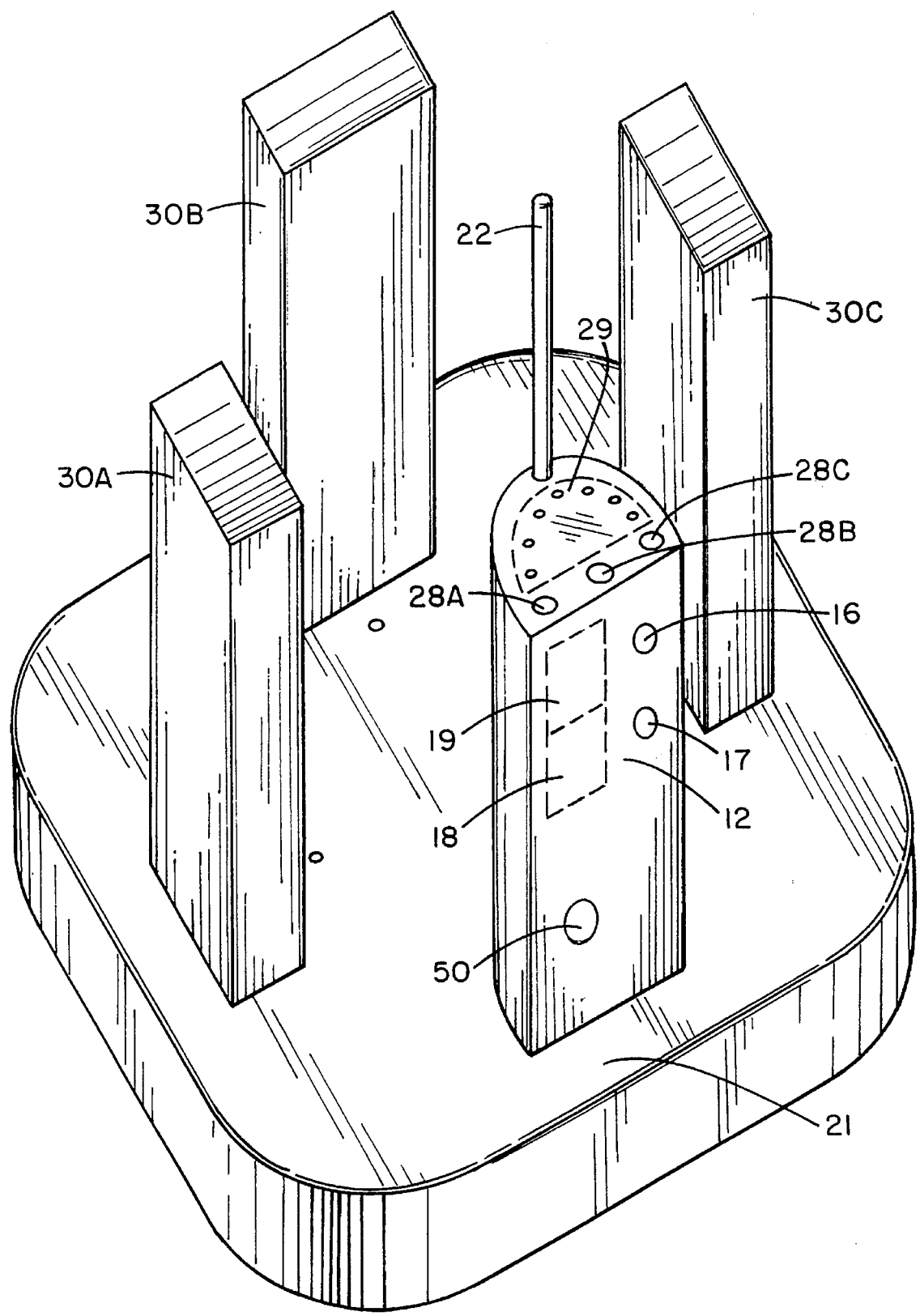
FIG. 3 is an illustration of a fixed stand for the base-station unit of the representative embodiment according to the present invention.

FIG. 3 is an illustration of a fixed stand 21 for the base-station unit 12 of the representative embodiment according to the present invention, and shows the base-station unit 12 and the transceiver units 30A, 30B, 30C docked in the fixed stand 21. In addition, FIG. 3 shows the custom set button 16, the option button 17, the base-station-receiving component 18, the base-station-transmitting component 19, the base-station antenna 22, the auditory means 50, the transceiver indicators 28A, 28B, 28C and the location indicator 29.

Figure 4:
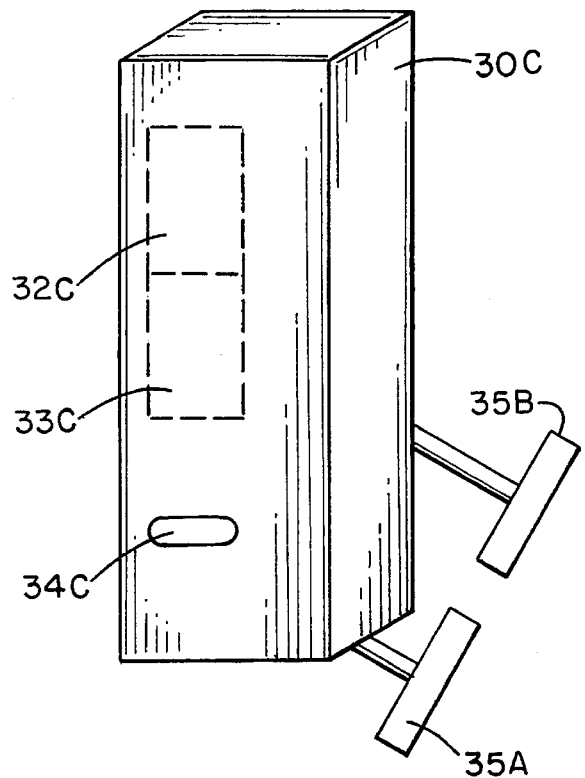
FIG. 4 is an illustration of a transceiver unit of the representative embodiment according to the present invention.

FIG. 4 is an illustration of the transceiver unit 30C shown in FIG. 1 and shows transceiver-transmitting component 32C, transceiver-receiving component 33C, voice-activated microphone 34C, and one or more dipolar antennas 35A and 35B connected to the transceiver unit 30C.

Figure 5:
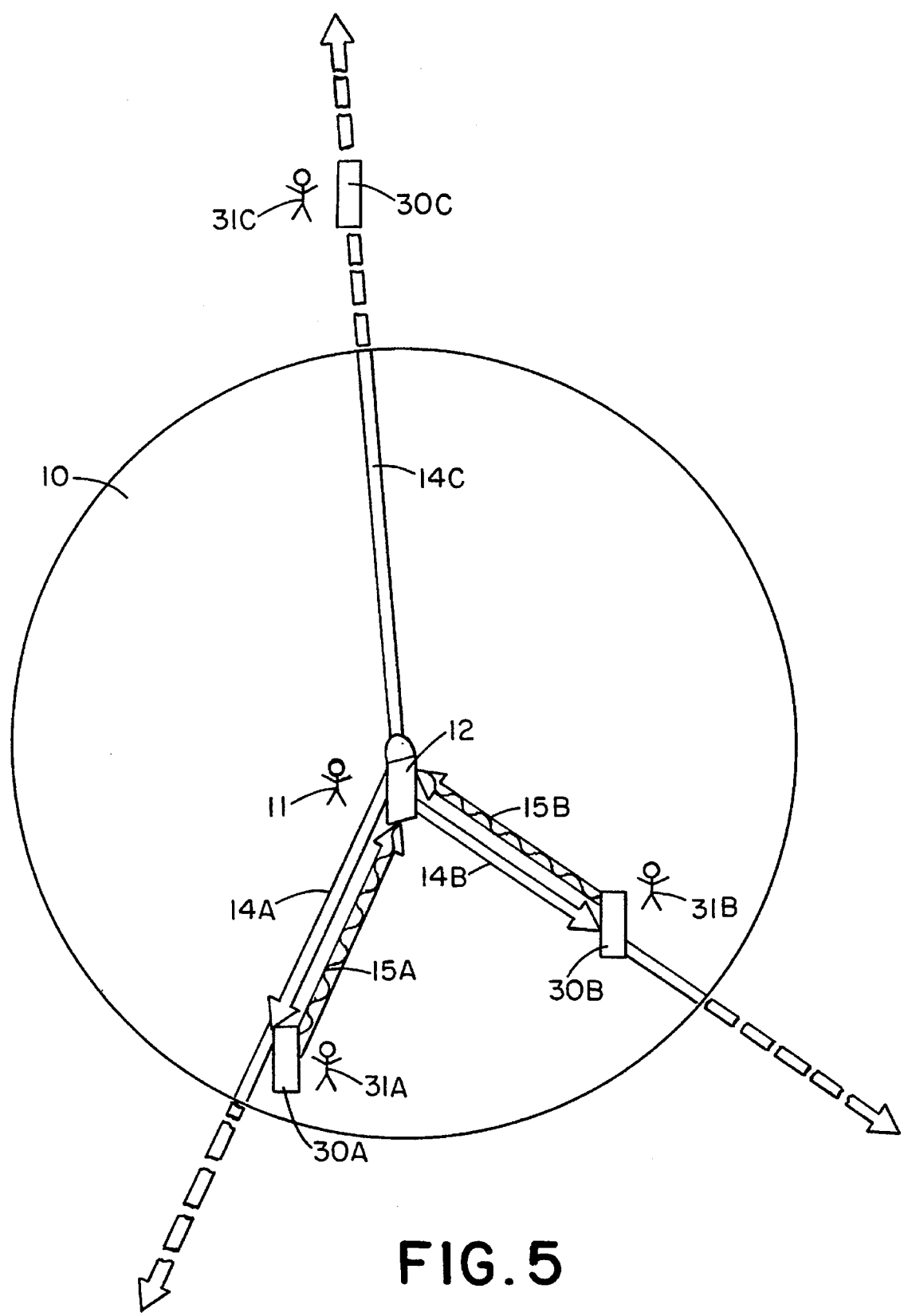
FIG. 5 is a functional block diagram showing the basic operation of the representative embodiment according to the present invention when the transceiver unit is moved to a location outside of a preselected distance.

FIG. 5 is a functional block diagram showing the basic operation of the representative embodiment according to the present invention 1 when the transceiver unit 30C is moved to a location beyond the preselected distance 10. In addition, FIG. 5 shows the base-station unit user 11, the base-station unit 12, the transceiver units 30A, 30B, the transceiver unit users 31A, 31B, 31C, the interrogation signals 14A, 14B, 14C, and the return signals 15A, 15B.

Figure 6:
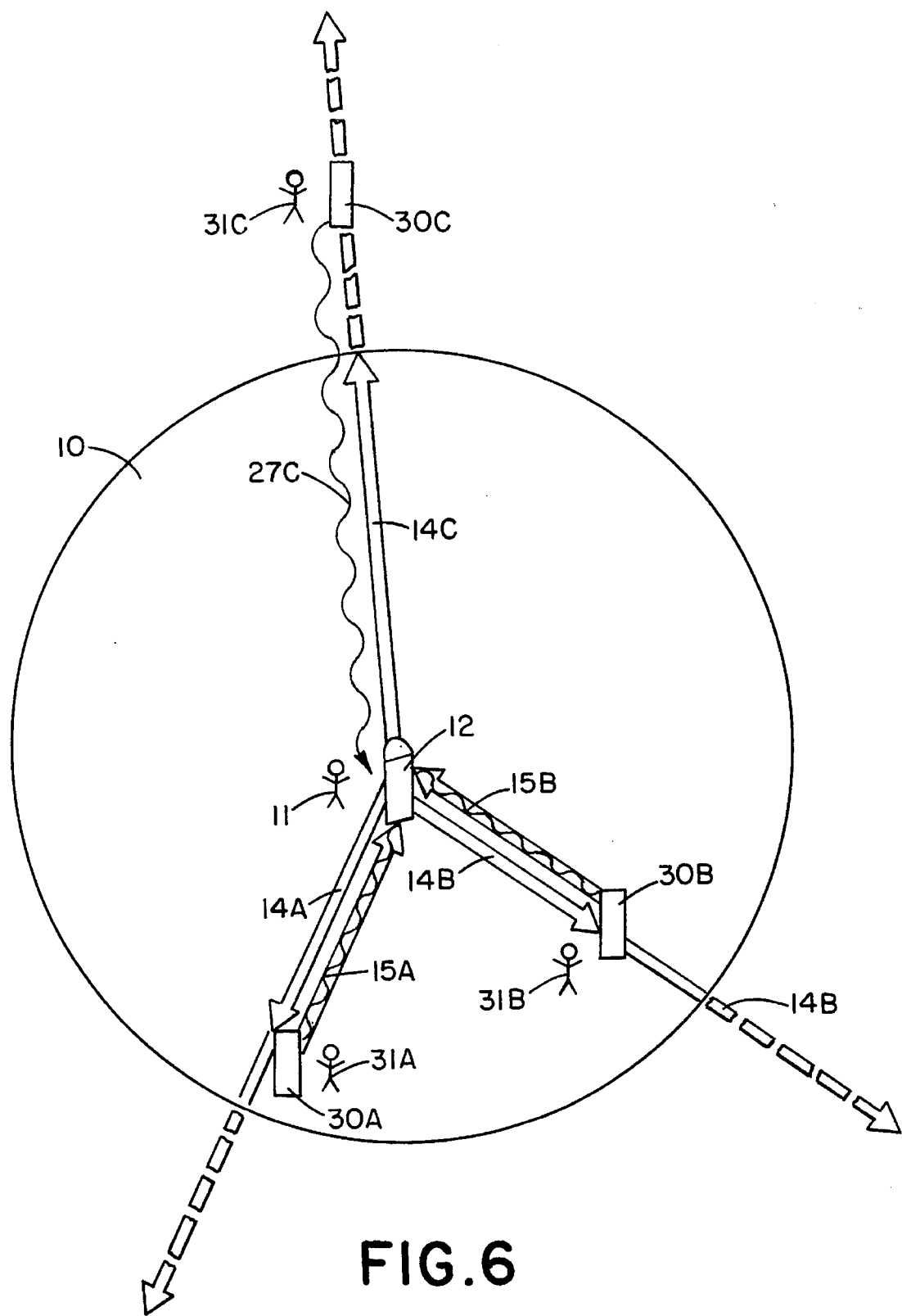
FIG. 6 is a functional block diagram showing the basic operation of the representative embodiment according to the present invention when the base-station unit is operating in a locating function after the transceiver unit is moved to a location outside of the preselected distance.

FIG. 6 is a functional block diagram showing the basic operation of the representative embodiment according to the present invention 1 when the base-station unit 12 is operating in a locating function after the expiration of a preselected delay period triggered at the base-station unit 12 when the transceiver unit 30C is moved to a location beyond the preselected distance 10. FIG. 6 shows the base-station unit user 11, the transceiver units 30A, 30B, the transceiver unit users 31A, 31B, 31C, the interrogation signal 14A, 14B, 14C, the return signals 15A, 15B, and the homing signal 15C.

In the overall operation of the present invention, a supervisor, babysitter, or parent, as the base-station unit user 11, may wish to ensure that one or more children 31A, 31B, and 31C (as the one or more transceiver units users 31A, 31B, 31C), remain within the preselected distance 10, such as an area enclosing a backyard or playground. The parent 11 can utilize the base-station unit 12, operating in the monitoring function, to continuously determine whether each of the children 31A, 31B, 31C (wearing or controlling the transceiver units 30A, 30B, 30C) are within the preselected distance 10. Thus, the base-station unit 12 of the representative embodiment performs the monitoring function and the locating function for each one of the one or more transceiver units 30A, 30B, 30C.

Upon any of one or more children 31A, 31B, 31C traveling outside of the preselected distance 10, the corresponding transceiver units 30A, 30B, 30C sound alarms to alert the children 31A, 31B, 31C to return to a position within the preselected distance 10. In the event that one or more children 31A, 31B, 31C remain outside of the preselected distance, the base-station unit 12, operating in the locating function, sounds an alarm to alert the parent 11. The parent 11 may then utilize the base-station unit 12 to locate the position of each of the children who is outside of the preselected distance 10.

Moreover, if any of the children 31A, 31B, 31C should return to the preselected distance 10 at any time, the base-station unit 12 can resume the monitoring function and cease the locating function for that child. For example, if the base-station unit 12 is operating in the locating function for the transceiver unit 30A, it can cease operating in the locating function and return to the monitoring function when the transceiver unit user 31A moves the transceiver unit 30A within the preselected distance 10.

In addition, with respect to those children that remain within the preselected distance 10, the base-station unit 12 can continue to operate in the locating function for those children. Thus, the monitoring and locating functions performed by the base-station unit 12 for each one of the transceiver units 30A, 30B, 30C, are independent of the other transceiver units 30A, 30B, 30C. For example, the base-station unit 12 can trigger the locating function for the transceiver unit 30C, while remaining in the monitoring function for the other transceiver units 30A and 30B.

A description of the components, in which the transceiver unit 30C is illustrative of each of the transceiver units 30A, 30B, 30C which make up the representative embodiment according to the present invention is set forth as follows. As shown in FIG. 2, the base-station unit 12 is a portable unit. Accordingly, the base-station unit 12 can operate while located in the fixed stand 21, or while removed from the fixed stand 21 and transported by the base-station unit user 11. The base-station unit 12 is provided with a base-station antenna 22 for transmission of the interrogation signal 14C and receipt of the return signal 15C and the homing signal 27C.

The base-station unit 12 may also be provided with means for selecting the preselected distance 10 from the base-station unit 12, within which the transceiver unit 30C should remain. The means for selecting the preselected distance 10, in the representative embodiment, includes a switch or the option button 17 which can contain several settings corresponding to several preselected distances defining a distance from the base-station. For example, in the representative embodiment, the base-station unit user 11 can select a predetermined distance defining the distance in the ranges of about 100, 200 or 300 feet from the base-station unit 12. The present invention 1 also contemplates setting the preselected distance by moving the transceiver unit 30C to a location which defines the desired distance from the base-station unit 12 and then activating a switch or the custom set button 16. In this way, the preselected distance 10 can be set to a precise distance determined by the base-station unit user 11.

In the representative embodiment, by transporting the base-station unit 12, while in the fixed stand 21 or removed, to another location during operation, the preselected distance 10, which is the distance from the base-station unit 12, changes with respect to the geographical area it defines. However, in alternative embodiments, the preselected distance 10 can be defined from a fixed point and the base-station unit 12 can communicate with the fixed point while being transported to a remote site.

The base-station-transmitting component 19 generates and sends the interrogation signal 14C to the transceiver unit 30C. The interrogation signals 14A, 14B, 14C may be sent at many suitable frequency levels, however, in a preferred embodiment the frequency range of about 49.82 to about 49.90 MHz is utilized. Additionally, the interrogation signals 14A, 14B, 14C may contain unique digitized coded information assigned exclusively to the transceiver units 30A, 30B, 30C and used to identify the transceiver units 30A, 30B, 30C. Also, each one of the transceiver units 30A, 30B, and 30C can have unique digitized coded information for communication with the corresponding interrogation signals 14A, 14B, 14C.

The base-station unit user 11 can be alerted to the operation of the base-station unit 12 in the monitoring and locating functions for each of the transceiver units 30A, 30B, and 30C. To indicate operation in the monitoring function, the base-station unit 12 can activate the transceiver indicators 28A, 28B, 28C (one for each of the transceiver units 30A, 30B, 30C), located on the base-station unit 12. The transceiver indicators 28A, 28B, 28C can be, for example, LEDs. Also, to indicate operation in the locating function, the base-station unit 12 can deactivate the transceiver unit indicators 28A, 28B, 28C.

The base-station unit 12, operating in the locating function, can display the strength of the homing signals 27A, 27B, 27C generated by transceiver units 30A, 30B, and 30C on the location indicator 29, such as, for example, a set of LEDs. Thus, when the base-station unit 12 triggers the locating function for the transceiver units 30A, 30B, 30C, the base-station unit 12 can alert the base-station unit user 11 by deactivating the transceiver unit indicators 28A, 28B, 28C and by displaying the detection and strength of the homing signals 27A, 27B, 27C on the location indicator 29. The present invention 1 may also include an independent locating function display for each one of the transceiver units 30A, 30B, 30C.

The components of the base-station unit 12 and the transceiver units 30A, 30B, 30C may be selected from a wide variety of small transceivers, which are FCC approved as electronic radio frequency devices, and which are well known to those skilled in the art as suitable for this purpose.

The transceiver unit 30C may be contained in a belt buckle or may be mounted on a belt with the use of, for example, a belt engaging hook, a belt clip or an alternative means such as a small pouch or bag. Additionally, means may be provided for automatically indicating to the base-station unit user 11 that any one of the transceiver units 30A, 30B, 30C has been removed from the control of its transceiver unit users 31A, 31B, 31C without authorization. For example, such means can comprise triggering the transceiver unit 30C to generate the homing signal 27C in the event that the belt is removed without authorization. In a representative embodiment, the belt can include a combination lock which must be used to remove the belt. If the belt is removed without the use of the combination lock, the transceiver unit 30C can generate and send for receipt by the base-station unit 12 the homing signal 27C. Alternatively, the transceiver unit 30C can be placed within or mounted on some other article of clothing.

The transceiver unit 30C is provided with one or more dipolar antennas 35A and 35B, for receipt of the interrogation signal 14C, and transmission of the return signal 15C and the homing signal 27C. The dipolar antennas 35A and 35B can be positioned, for example, in the belt, at one or more locations to facilitate communication and minimize interference. For example, two dipolar antennas 35A and 35B can be placed in the belt for mounting near the hips of the transceiver unit user 31C.

The transceiver units 30A, 30B, and 30C may also be provided with a voice activated microphone 34C and means for transmitting the voice signals in which case the base unit 12 is also provided with means for receiving the voice communication and a speaker 50.

The transceiver units 30A, 30B, 30C may also be adapted to cease generating the return signal 15A, 15B and 15C the transceiver unit 30A, 30B, or 30C should become immersed in water, for example, if a child falls into a pool or lake. Thus, the parent 11 is notified of this emergency even if the child remains within preselected distance 10.

The transceiver-receiving component 33C of the transceiver unit 30C detects the interrogation signal 14C, which can contain the digitized information corresponding to the transceiver unit 30C, sent by the base-station-transmitting component 19.

The transceiver-transmitting component 32C generates and sends the return signal 15C to the base-station-receiving component 18 in response to the detection of the interrogation signal 14C by the transceiver-receiving component 33C. The return signal 15C may be sent in a wide range of frequencies, however, in a preferred embodiment the frequency range of about 49.82 to about 49.90 MHz is utilized. The return signal 15C may be adapted to contain unique digitized coded information for communication with the corresponding interrogation signal 14C.

Alternatively, the transceiver-transmitting component 32C can generate and send the homing signal 27C to the base-station-receiving component 18. The homing signal 27C can, for example, in the representative embodiment, consist of a continuous wave signal at about 470 MHz. In addition, in the representative embodiment, the homing signal 27C is not unique to each of the transceiver units 30A, 30B, 30C. Accordingly, the location indicator 29, upon the base-station-receiving component 18 detecting the homing signals 27A, 27B, 27C does not distinguish between the transceiver units 30A, 30B, 30C on the location indicator 29.

As shown in FIG. 3, the fixed stand 21 for the base-station unit 12 may contain docking stations for holding the base-station unit 12 and the transceiver units 30A, 30B and 30C. The fixed stand 21 can serve as a recharging station for both the base-station unit 12 and transceiver units 30A, 30B, 30C. In addition, both the base-station unit 12 and the transceiver units 30A, 30B, and 30C can be battery operated, using either rechargeable or disposable batteries.

A detailed functional description of the present invention 1 is set forth below. The description is generally directed to the transceiver unit 30C since the present invention 1 operates in the same manner for each of the one or more transceiver units 30A, 30B, and 30C.

After the base-station unit 12 is energized and the preselected distance 10 is set, the base-station unit 12 begins operating in the monitoring function for each one of the transceiver units 30A, 30B, 30C. The base-station unit 12 can continue to operate in the monitoring function so long as, for example, the transceiver unit 30C remains within the preselected distance 10 and is operable. Under these conditions, the base-station unit 12 generates and sends the interrogation signal 14C to the transceiver-receiving component 33C of transceiver unit 30C which, in turn, receives the interrogation signal 14C. In response, the transceiver-transmitting component 32C on the transceiver unit 30C generates and sends a return signal 15C. The base-station-receiving component 18 then receives the return signal 15C. The communication between the base-station unit 12 and the transceiver unit 30C can continuously proceed as follows: the base-station-transmitting component 19 sends the interrogation signal 14C, and the detection of the interrogation signal 14C by the transceiver-receiving component 33C, which corresponds to the digital component of the interrogation signal 14C, triggers the transceiver-transmitting component 32C to send the return signal 15C to the base-station-receiving component 18.

However, the base-station unit 12 can trigger the locating function after a change in the conditions under which the base-station unit 12 operates in the monitoring function. More specifically, when both of two situations occur, the base-station unit 12 can trigger operation in the locating function: First, either the transceiver unit 30C is moved outside of the preselected distance or the transceiver unit 30C becomes inoperable; and second, the delay period, such as, for example, 10 seconds, which is triggered at the base-station unit 12 as a result of the first situation, expires.

Moreover, if the transceiver unit 30C is located outside the preselected distance 10, the transceiver-receiving component 33C does not detect the interrogation signal 14C because, based on the base-station unit user 11 setting the preselected distance 10, the transceiver-receiving component 33C is set to receive the interrogation signal 14C only while the transceiver unit 30C remains within the preselected distance 10. Since the transceiver-receiving component 33C is unable to detect the interrogation signal 14C sent by the base-station-transmitting component 19, it detects an interruption in the interrogation signal 14C and, as a result, ceases to respond with the return signal 15C.

In addition, the transceiver-transmitting component 32C can alert the transceiver unit user 31C that the transceiver unit 30C is outside of the preselected distance 10, e.g., if the transceiver unit user 31C travels to a location outside of the preselected distance 10, the transceiver unit 30C enters the mode in which the transceiver unit 30C warns the transceiver unit user 31C to return to a location within the preselected distance 10. The warning may consist of a series of audible tones generated by auditory means 50. The audible signal tones serve as a warning to instruct the transceiver unit user 31C to return to the preselected distance 10 from the base-station 12.

If the transceiver unit user 31C does not return to a location inside the preselected distance 10 within the delay period, which is triggered at the transceiver unit 30C, the transceiver unit 30C enters a mode in which the transceiver-transmitting component 32C sends out the homing signal 27C. The delay period, in a representative embodiment, can be about 10 seconds. At the end of the delay period, if the transceiver unit user 31C has not returned to a location within the preselected distance 10, the transceiver unit 30C will trigger the transceiver-transmitting component 32C to send the homing signal 27C.

Additionally, if the transceiver unit 30C malfunctions or is rendered inoperable, the transceiver-transmitting component 32C ceases operation and cannot send the return signal 15C. This may occur, for example, when a child, as the transceiver unit user 31C, falls into a pool, thereby disabling the transceiver unit 30C's electrical hardware, or, as another example, when the batteries of one of the transceiver units 30A, 30B, 30C expire.

In the absence of any of these situations which, in the representative embodiment, cause the transceiver-receiving component 33C to cease sending the return signal 15C, the base-station unit 12 can continue to operate in the monitoring function.

Once the base-station unit 12 triggers the locating function, the base-station unit 12 operates to locate the transceiver unit 30C from which the transceiver-transmitting component 32C generates and sends the homing signal 27C. The range of the base-station unit 12 operating in the locating function may be affected by structures such as, bridges, water and electrical towers, homes, other radio frequency devices being operated in the vicinity, and unusual atmospheric conditions, however under ideal conditions a range of about 1,000 feet can be expected.

The base-station unit 12 includes direction finding circuitry for operating in the locating function for receiving the homing signal 27C via base-station receiving component 18. This circuitry can indicate the direction of the transceiver unit 30C and, thus, the location of the transceiver unit user 31C. As the base-station unit user 11 points the base-station unit 12 in various directions, the base-station unit 12 can display the strength of the homing signal 27C received from each of the various directions on the location indicator 29. By indicating to the base-station unit user 11 the direction from which the strength of the homing signal 27C is the strongest, the base-station unit 12 allows the base-station unit user 11 to locate the transceiver unit 30C.

In addition, if the base-station unit 12 triggers the locating function with respect to more than one of the transceiver units 30A, 30B, and 30C, the detection and strength of the homing signals 27A, 27B, and 27C sent by each of the transceiver units 30A, 30B, and 30C, is displayed on the location indicator 29.

When the transceiver unit user 31C travels beyond the preselected distance 10, the base-station unit 12, although operating in the locating function, continues to send out the interrogation signal 14C. Thus, if the transceiver unit 30C is moved to a location within the preselected distance 10 after the base-station unit 12 is operating in the locating function, the transceiver-receiving component 33C continues to detect the interrogation signal 14C, and the transceiver-transmitting component 32C responds by generating the return signal 15C. The base-station-receiving component 18 then detects the return signal 15C and reestablishes the monitoring function for the transceiver unit 30C.

In addition, when the base-station unit 12 is operating in the locating function for, for example, the transceiver units 30A and 30B, the base-station unit 12 continues to operate in the monitoring function for the other transceiver unit 30C.

Moreover, in the event that the base-station unit 12 is transported from the site at which the preselected distance 10 was set, the geographical area defined by the preselected distance 10 from the base-station unit 12 can change. In this way, although the base-station unit 12 continues to operate in the monitoring or locating functions according to the description set forth above, the movement of the base-station unit 12 relative to the transceiver units 30A, 30B, 30C, can trigger the monitoring and operating functions due to the change in the geographical area defined by the preselected distance 10.

The transceiver units 30A, 30B, and 30C can also contain a voice-activated microphone, for example 34C, in the transceiver unit 30C, which in a preferred embodiment transmits, in the 49.82–49.90 MHz frequency range.

The present invention 1 contemplates the use of an adapter for an AC power source. Using this function, it is further contemplated that the present invention 1 may be used, for example, to monitor the transceiver unit user 31C, who may be an infant in a crib, at a location remote from the base-station unit 12.

What is claimed is:

1. A monitoring and locating system comprising:

a base-station and a remote transceiver, said base-station provided with means for generating an interrogation signal for receipt by said remote transceiver at a preselected interrogation distance from a fixed point;

said base-station provided with means for detecting the receipt of a homing signal generated by said remote transceiver;

said base-station provided with means for detecting the receipt or interruption of a return signal generated by said remote transceiver and for alerting a user of said base-station of the interruption of said return signal;

said base-station provided with means for locating said homing signal generated by said remote transceiver;

said remote transceiver provided with means for detecting said interrogation signal within said preselected interrogation distance from said fixed point;

said remote transceiver provided with means for generating said return signal in response to said interrogation signal;

said remote transceiver provided with means for detecting the receipt or interruption of said interrogation signal and for alerting a user of said remote transceiver upon said detected interruption at the remote transmitter that said remote transceiver has moved beyond said preselected interrogation distance; and said remote transceiver provided with means for generating said homing signal after said remote transceiver moves beyond said preselected interrogation distance from said fixed point.

2. The monitoring and locating system of claim 1 further comprising batteries to provide power to the base-station and to the transceiver unit.

3. The monitoring and locating system of claim 2 wherein said batteries are rechargeable.

4. The monitoring and locating system of claim 3 further comprising a fixed stand to charge said rechargeable batteries.

5. The monitoring and locating system of claim 4 further comprising means for selecting said preselected interrogation distance from said base-station.

6. The monitoring and locating system of claim 1 wherein said remote transceiver further comprises a microphone for communicating with said base-station and said base-station further comprises means to receive transmissions from said microphone.

7. The monitoring and locating system of claim 6 wherein said microphone operates in the frequency range of about 49.82–49.90 MHz.

8. The monitoring and locating system of claim 1 wherein said fixed point is defined as said base-station.

9. The monitoring and locating system of claim 1 further comprising means for selecting said preselected distance from said base-station.

10. The monitoring and locating system of claim 1 wherein said base-station further comprising means for indicating the receipt of said return signal from said remote transceiver.

11. The monitoring and locating system of claim 1 wherein said base-station further comprising means for indicating the interruption of said return signal from said remote transceiver.

12. The monitoring and locating system of claim 1 wherein said base-station further comprising means for indicating the receipt of said homing signal from said remote transceiver.

13. The monitoring and locating system of claim 1 wherein said remote transceiver ceases to generate said return signal upon immersion in water.

14. The monitoring and locating system of claim 1 further comprising means for indicating an unauthorized removal of the said remote transceiver from said user of said remote transceiver.

15. The monitoring and locating system of claim 1 wherein said base-station waits a predetermined period of time before activating said means for detecting said homing signal from said remote transceiver.

16. The monitoring and locating system of claim 1 wherein said remote transceiver is adapted to wait a predetermined period of time before activating said means for generating said homing signal.

17. The monitoring and locating system of claim 1 wherein said interrogation signal operates in the frequency range of about 49.82–49.90 MHz.

18. The monitoring and locating system of claim 1 wherein said return signal operates in the frequency range of about 49.82–49.90 MHz.

19. The monitoring and locating system of claim 1 wherein said homing signal operates at a frequency of about 470 MHz.

20. A monitoring and locating system comprising:

a base-station and a plurality of remote transceivers, said base-station provided with means for generating a plurality of distinct interrogation signals for receipt by said plurality of remote transceivers at a preselected interrogation distance from said base-station each of said plurality of distinct interrogation signals communicates with a respective one of said plurality of remote transceivers;

said base-station provided with means for detecting and distinguishing between the receipt of a plurality of homing signals;

said base-station provided with means for detecting the receipt or interruption of each of said plurality of distinct return signals generated by said plurality of remote transceivers and for alerting a user of said base-station of the interruption of each of said plurality of distinct return signals;

said base-station provided with means for locating a source of said plurality of homing signals generated by said plurality of said remote transceivers;

said plurality of remote transceivers each operable to detect one of said plurality of distinct interrogation signals within said preselected distance from said base-station;

each one of said plurality of remote transceivers provided with means for generating a distinct return signal in response to receipt of a respective one of said distinct interrogation signals;

each one of said plurality of remote transceivers provided with means for detecting the receipt or interruption of said interrogation signals and for alerting a user of one of said plurality of remote transceivers upon said detected interruption at said user's remote transceiver that said user's remote transceiver has moved beyond said preselected interrogation distance; and each one of said plurality of remote transceivers provided with means for generating a homing signal in response to moving beyond said preselected distance from said base-station.

\* \* \* \* \*